Nov. 2, 1965  F. HAWORTH  3,215,764

PROCESS OF MOLDING AN OUTSOLE TO A SHOE UPPER

Filed March 20, 1964  2 Sheets-Sheet 1

INVENTOR:
Frank Haworth
BY
Richard J. Striker

Nov. 2, 1965  F. HAWORTH  3,215,764
PROCESS OF MOLDING AN OUTSOLE TO A SHOE UPPER
Filed March 20, 1964  2 Sheets-Sheet 2
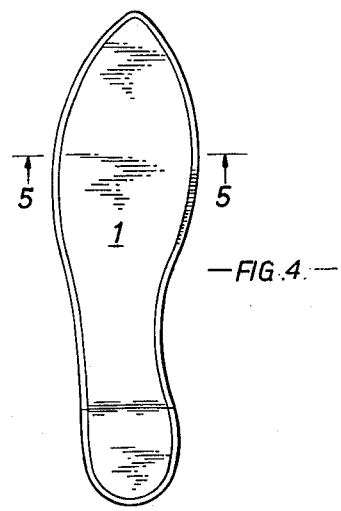
— FIG. 4. —
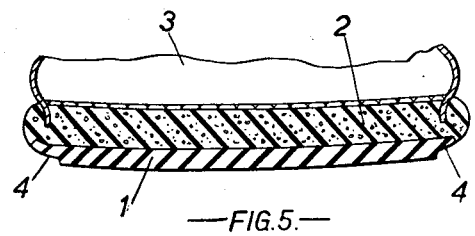
— FIG. 5. —
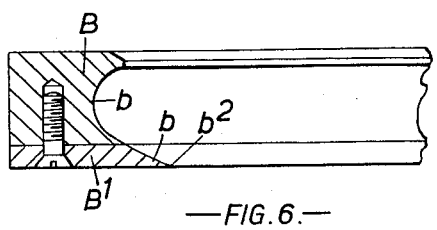
— FIG. 6. —
INVENTOR:
Frank Haworth
BY 3,215,764
PROCESS OF MOLDING AN OUTSOLE
TO A SHOE UPPER
Frank Haworth, Healey Royd, Burnley, England
Filed Mar. 20, 1964, Ser. No. 353,546
4 Claims. (Cl. 264—244)

The present application is a continuation-in-part of my application Ser. No. 101,828, filed Apr. 10, 1961, and entitled Moulds for Footwear.

The present invention relates to a method of moulding footwear. More particularly, the invention relates to a method of moulding an outsole to a shoe portion without the formation of flash. The method of the present invention utilizes a mould of the type in which an outsole or sole skin is inserted on the base plate of the mould to receive a sponge rubber midsole mix.

A mould has been proposed having a recessed base plate and an apertured ring formed in two parts pivoted together, the base and ring being positioned in a box. An outsole is placed on the base plate and covered with sponge rubber midsole mix and the upper on a last is then lowered to form the top of the mould. The sponge rubber midsole mix expands during vulcanization and the outsole and upper are adhered to the sponge rubber midsole during vulcanization. In such a mould, however, a flash is formed around the junction between the outsole and the sponge rubber midsole and such a flash must be removed from the finished shoe.

In another mould, the base is provided with a raised portion of the shape and contour of the outsole in an attempt to overcome the formation of flash. The raised portion of the base is of the shape and contour of the outsole, but of slightly smaller dimensions. The ring is formed to fit around the raised portion, the lower part of the inner face of the ring forming a shoulder fitting around the raised portion and the top of the shoulder being level with the top surface of the raised portion so as to form a continuation thereof. The outsole is placed on the raised portion with its edges extending over the joint between the shoulder and the raised portion so that the flash cannot be formed by the extrusion of material therebetween. There is the disadvantage, however, that when the ring wears the top of the shoulder comes out of alignment with the top of the raised portion resulting in irregularities being formed near the edges of the under surface of the outsole of the finished shoe. Such irregularities may be quite unsightly.

The principal object of the present invention is to provide a new and improved method of moulding a shoe.

An object of the present invention is to provide a method of moulding a shoe which prevents the formation of flash.

In accordance with the present invention, the method of moulding a shoe comprises moulding an outsole to a shoe portion in a mould comprising a recessed base plate, a ring formed in two parts, a hinge connecting the parts of the ring together at one end and a clamp at the opposite end for securing the parts of the ring in the moulding position and an inwardly extending rigid stepped flange around the lower inner edge of the aperture in the ring to extend over the base plate. The ring is placed on the base plate, the ring is closed and clamped. An outsole is placed in the mould with the edges thereof overlapping and resting on the rigid stepped flange to prevent the formation of a flash during vulcanization. Midsole material is placed on top of the outsole. An upper is placed on the midsole material. Heat is applied to the mould to form the midsole and to adhere the outsole and the upper to the midsole, and the ring is unclamped and opened.

The method of the present invention not only prevents the formation of flash, but it produces a shallow recess or indentation all around the edge of the outsole which provides a pleasing appearance and also reduces the thickness of the outsole at the parts where the least amount of wear occurs.

In order that the present invention may be readily carried into effect, it will now be described with reference to the accompanying drawings, wherein:

FIG. 4 is a bottom plan of an embodiment of a shoe, and more specifically an outsole, formed by the method of the present invention;

FIG. 5 is a transverse section of the lower portion of the shoe of FIG. 4 taken along the line 5—5 of FIG. 4 and presented in enlarged scale; and FIG. 6 is a partial section of another embodiment of the ring portion of FIG. 2.

Figure 1:
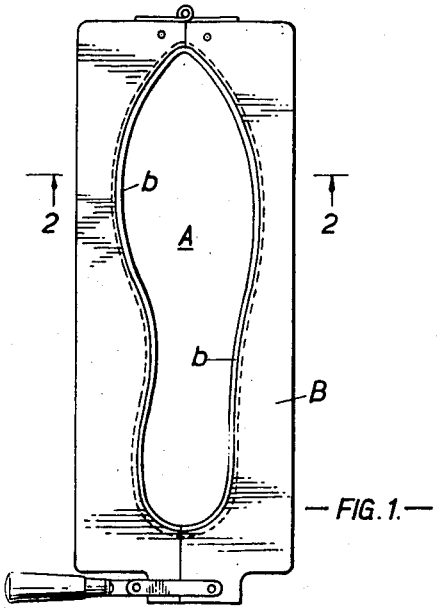
FIG. 1 is a top plan of an embodiment of the ring portion of the mould utilized in the method of the invention applied to the base plate.

The mould utilized in the method of the present invention comprises a moulding box which receives a recessed base plate A of known construction upon which is placed a ring B. The ring B is formed in two parts and the parts of the ring are connected together at one end by a hinge, as shown in FIG. 1. The two parts of the ring B are secured in the moulding position by a clamp at the end of said ring opposite the hinged end, as shown in FIG. 1. The ring B is provided with an inwardly extending rigid stepped flange or lip $b$ around the lower inner edge of the aperture in the ring. The flange or lip $b$ gradually blends or merges into the substantially vertical portion $b^1$ of the ring B which may be curved as shown in FIG. 2, or which may be otherwise shaped to provide any desired contour for the edge of the finished outsole.

Figure 2:
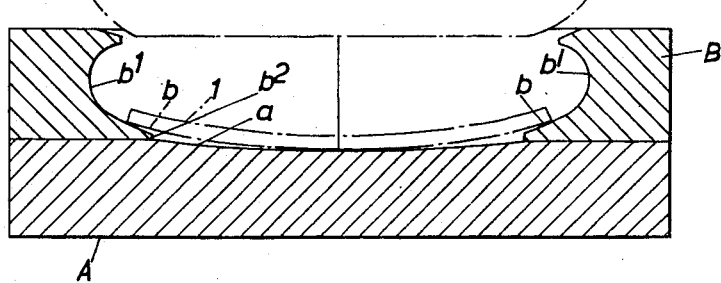
FIG. 2 is a transverse section of the ring portion of FIG. 1 taken along the line 2—2 of FIG. 1 and presented in enlarged scale.
Figure 3:
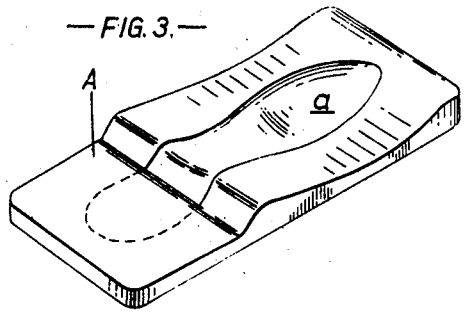
FIG. 3 is a perspective view of an embodiment of the base plate of the mould utilized in the method of the present invention.

The flange or lip $b$ may be formed integrally with the ring B, as shown in FIG. 2, or a plate $B^1$, with the flange or lip $b''$ formed thereon, may be secured to the underside of the ring, as shown in FIG. 6.

The edge of the flange or lip $b$ resting on the base plate A forms a rigid step $b^2$ since it is not practically possible for the flange or lip to rest on the base plate without the formation of such a step.

In the method of the present invention, the ring B is placed on the base plate A. The ring B is closed and clamped. An outsole 1, which is the wearing surface of the sole of the shoe, is placed in the ring B of the mould resting on the base plate A with the edges of said outsole overlapping or extending over and resting on the rigid stepped flange or lip $b$. The positioning of the outsole 1 to overlap and rest on the flange or lip $b$ prevents the formation of a flash during vulcanization. The midsole material, which may comprise a rubber mixture containing an inflating or expanding agent, is placed on top of the outsole 1. The last, on which an upper 3 has been placed, is brought into the top of the ring B with the upper placed on the midsole material. Heat is applied to the mould to form the midsole 2 and to adhere the outsole 1 and the upper 3 to said midsole. The heat expands the rubber midsole material to fill the mould and thereby form the midsole 2, to vulcanize the rubber, and to cause the outsole 1 and the upper 3 to adhere to said midsole. The ring B is then unclamped and opened. The finished shoe, which is removed from the ring, has a recess or depression 4, as shown in FIG. 5, formed around the edge of the outsole 1. The outsole 1 of the finished shoe is of highly pleasing appearance, without flash.

While the invention has been described by means of a specific example and in a specific embodiment, I do not wish to be limited thereto, for obvious modifications will occur to those skilled in the art without departing from the spirit and scope of the invention.

What I claim is:

1. A method of molding an outsole to a shoe upper in a mold formed with a bottom wall having an upper surface, and with a peripheral wall having a rigid flange integral therewith and having an inwardly directed face extending inwardly of said peripheral wall and upwardly of said upper surface, said method comprising the steps of: placing an outsole on said bottom wall with edge portions of said outsole overlying said flange and with the bottom face of said outsole forming a free peripheral space with said inwardly directed face of said flange and the peripheral edge portion of said bottom wall adjacent said face of said flange; placing a vulcanizable midsole material on top of said outsole; placing a shoe upper on said midsole material; and heating the thus assembled outsole, vulcanizable midsole material and shoe upper in said mold so as to vulcanize them to each other while simultaneously causing said outsole to penetrate said peripheral space so as to form a peripheral step in its edge face, and also simultaneously causing said edge portions of said outsole overlying said rigid flange to act as a seal and prevent said midsole material from penetrating intermediate said bottom wall and said outsole and from thereby forming a flash along the edge of said outsole.

2. A method of molding an outsole to a shoe upper in a mold formed with a bottom wall having an upper surface, and with a peripheral wall having a rigid flange integral therewith and having an inwardly directed face extending inwardly of said peripheral wall and upwardly of said upper surface, said method comprising the steps of: placing an outsole on said bottom wall with edge portions of said outsole overlying said flange and with said bottom face of said outsole forming a free peripheral space with said inwardly directed face of said flange and the peripheral edge portions of said bottom wall adjacent said face of said flange; placing a vulcanizable midsole material on top of said outsole; placing a shoe upper on said vulcanizable midsole material; and heating the thus assembled outsole, vulcanizable midsole material and shoe upper in said mold so as to vulcanize them to each other while simultaneously causing said outsole to penetrate said peripheral space so as to form a peripheral step in its edge face, and also simultaneously causing said edge portions of said outsole overlying said rigid flange to act as a seal and prevent said midsole material from penetrating intermediate said bottom wall and said outsole and from thereby forming a flash along the edge of said outsole.

3. A method of molding an outsole to a shoe upper in a mold comprising a base plate having an upper surface, and peripheral wall means removable from said base plate and having a lower edge having a rigid stepped flange integral therewith and having an inwardly directed face extending inwardly therefrom, said method comprising the steps of positioning said peripheral wall means on said base plate with said rigid stepped flange overlying a corresponding portion of said upper surface and extending upwardly therefrom; placing an outsole on said base plate within the area defined by said peripheral wall means with edge portions of said outsole overlying said rigid stepped flange so as to cover said inwardly directed face; placing a vulcanizable midsole material on top of said outsole and with the bottom face of said outsole forming a free peripheral space with said inwardly directed face of said flange and the peripheral edge portion of said bottom wall adjacent said face of said flange; placing a shoe upper on said midsole material; heating the thus assembled outsole, vulcanizable midsole material and shoe upper in said mold so as to vulcanize them to each other while simultaneously causing said outsole to penetrate said peripheral space so as to form a peripheral step in its edge face, and also simultaneously causing said edge portions of said outsole overlying said rigid flange to prevent the midsole material from penetrating intermediate said base plate and said outsole and from thereby forming a flash; and removing said peripheral wall means from said base plate for releasing the finished shoe from said mold.

4. A method of molding an outsole to a shoe upper in a mold comprising a recessed base plate having an upper surface, and a ring member formed in two parts hinged together at one end and provided with a clamp at the other end for securing said parts together in a molding position, said ring member having an inner wall stepped so as to form adjacent the lower circumferential edge portion of said inner wall an inwardly extending rigid flange adapted to overlie a corresponding portion of said upper surface of the base plate and having an inwardly directed face, said method comprising the steps of placing said ring on said base plate in a molding position and surrounding the recess in said base plate; positioning an outsole which is larger than said recess on the base plate so that edge portions of said outsole overlie said rigid flange with said inwardly directed face thereof and are raised thereby from contact with said upper surface of said base plate; placing a midsole material vulcanizable under the influence of heat on said outsole; placing a shoe upper on said midsole material; heating the thus assembled outsole, vulcanizable midsole material and shoe upper in said mold so as to vulcanize them to each other while simultaneously causing said outsole to penetrate said peripheral space so as to form a peripheral step in its edge face, and also simultaneously causing, the edge portions of said outsole which overlie said flange to act as a seal to prevent the midsole material from penetrating intermediate said outsole and said upper surface and thereby forming a flash; terminating the application of heat to said mold so as to cause the midsole material to cool whereby to unite said upper and said outsole; and removing the finished shoe from said mold.

References Cited by the Examiner

UNITED STATES PATENTS 3,014,244 12/61 Jansjosten _____ 264—244

FOREIGN PATENTS 204,925 8/59 Austria.
217,786 8/58 Australia.
840,839 7/60 Great Britain.

ROBERT F. WHITE, *Primary Examiner.*

ALEXANDER H. BRODMERKEL, *Examiner.*